(12) United States Patent
Chern

(10) Patent No.: US 7,904,516 B2
(45) Date of Patent: Mar. 8, 2011

(54) VOICE ATTACHMENT TO AN EMAIL USING A WIRELESS COMMUNICATION DEVICE

(75) Inventor: Vincent Chern, San Diego, CA (US)

(73) Assignee: Leap Wireless International, Inc., San Diego, CA (US)

( * ) Notice: Subject to any disclaimer, the term of this patent is extended or adjusted under 35 U.S.C. 154(b) by 755 days.

(21) Appl. No.: 09/881,671

(22) Filed: Jun. 18, 2001

(65) Prior Publication Data

US 2002/0194279 A1  Dec. 19, 2002

(51) Int. Cl.
*G06F 15/16* (2006.01)
*H04M 1/725* (2006.01)

(52) U.S. Cl. ....... 709/206; 709/204; 709/205; 455/412.1

(58) Field of Classification Search .......... 709/204–206; 379/88.13–88.16, 93.01, 88.17; 455/450, 455/464, 412.1
See application file for complete search history.

(56) References Cited

U.S. PATENT DOCUMENTS

| | | | |
|---|---|---|---|
| 5,127,042 A * | 6/1992 | Gillig et al. ................. | 455/552.1 |
| 5,557,659 A * | 9/1996 | Hyde-Thomson ......... | 379/88.13 |
| 5,604,788 A | 2/1997 | Tett | |
| 5,848,396 A | 12/1998 | Gerace | |
| 5,852,775 A | 12/1998 | Hidary | |
| 5,915,001 A * | 6/1999 | Uppaluru .................... | 379/88.22 |
| 5,991,735 A | 11/1999 | Gerace | |
| 5,999,594 A * | 12/1999 | Mizoguchi et al. ........ | 379/88.14 |
| 6,050,898 A | 4/2000 | Vange et al. | |
| 6,055,510 A | 4/2000 | Henrick et al. | |
| 6,081,780 A | 6/2000 | Lumelsky | |
| 6,085,231 A * | 7/2000 | Agraharam et al. .......... | 709/206 |
| 6,112,054 A | 8/2000 | Kita | |
| 6,113,494 A | 9/2000 | Lennert | |
| 6,134,532 A | 10/2000 | Lazarus et al. | |
| 6,138,036 A | 10/2000 | O'Cinneide | |
| 6,141,328 A * | 10/2000 | Nabkel et al. ................. | 370/259 |
| 6,157,841 A | 12/2000 | Bolduc et al. | |
| 6,181,927 B1 | 1/2001 | Welling, Jr. et al. | |
| 6,205,342 B1 * | 3/2001 | Oakes et al. .................. | 455/566 |
| 6,208,866 B1 | 3/2001 | Rouhollahzadeh et al. | |
| 6,212,550 B1 * | 4/2001 | Segur ............................ | 709/206 |
| 6,212,551 B1 * | 4/2001 | Asghar et al. ................. | 709/206 |
| 6,216,129 B1 | 4/2001 | Eldering | |
| 6,222,909 B1 * | 4/2001 | Qua et al. .................... | 379/88.22 |
| 6,223,291 B1 | 4/2001 | Puhl et al. | |
| 6,240,391 B1 * | 5/2001 | Ball et al. ...................... | 704/270 |
| 6,351,523 B1 * | 2/2002 | Detlef .......................... | 379/88.14 |

(Continued)

FOREIGN PATENT DOCUMENTS

EP  1066867 A2  1/2001

(Continued)

*Primary Examiner* — Joseph Thomas
*Assistant Examiner* — Lashanya R Nash

(57) ABSTRACT

The present invention is directed to a multimedia electronic (mail) system and method for sending a voice message to an email recipient. The multimedia mail system includes a wireless communications network, at least one wireless communication device, an interactive voice response server for converting the voice message to a digitally stored audio file, and an email server for sending the audio file to the email recipient. The method of the present invention comprises the steps of communicatively connecting to a first server over the wireless communications network, selecting an option to send the audio file to the email recipient, communicatively connecting to a second server over the wireless communications network, recording the audio file on the second server, and sending the audio file to the email recipient.

24 Claims, 11 Drawing Sheets

U.S. PATENT DOCUMENTS

| | | | |
|---|---|---|---|
| 6,385,306 B1 * | 5/2002 | Baxter, Jr. | 379/88.13 |
| 6,424,828 B1 * | 7/2002 | Collins et al. | 455/412.1 |
| 6,424,945 B1 * | 7/2002 | Sorsa | 704/270.1 |
| 6,463,134 B1 * | 10/2002 | Okada et al. | 379/93.24 |
| 6,751,454 B2 * | 6/2004 | Thornton | 455/412.1 |
| 6,813,489 B1 * | 11/2004 | Wu et al. | 455/412.1 |
| 6,917,965 B2 * | 7/2005 | Gupta et al. | 709/206 |
| 7,092,370 B2 * | 8/2006 | Jiang et al. | 370/329 |
| 2001/0005839 A1 | 6/2001 | Maenpaa et al. | |
| 2001/0011248 A1 | 8/2001 | Himmel et al. | |
| 2001/0013037 A1 | 8/2001 | Matsumoto | |
| 2001/0014911 A1 | 8/2001 | Doi et al. | |
| 2001/0034225 A1 * | 10/2001 | Gupte et al. | 455/412 |
| 2002/0016174 A1 * | 2/2002 | Gibson et al. | 455/464 |
| 2002/0052912 A1 * | 5/2002 | Griswold et al. | 709/200 |
| 2005/0059382 A1 * | 3/2005 | Brun et al. | 455/412.1 |

FOREIGN PATENT DOCUMENTS

| | | |
|---|---|---|
| EP | 1066868 A2 | 1/2001 |
| EP | 1086732 A1 | 3/2001 |
| EP | 1087323 A1 | 3/2001 |
| GB | 2345613 A * | 7/2000 |
| JP | 2000174931 A | 6/2000 |
| WO | WO 9965256 A2 * | 12/1999 |

* cited by examiner

VOICE ATTACHMENT TO AN EMAIL USING A WIRELESS COMMUNICATION DEVICE

CROSS REFERENCE TO RELATED PATENT APPLICATION

This application relates to and claims priority on Provisional Application Ser. No. 60/279,439, filed Mar. 29, 2001 and entitled "VOICE ATTACHMENT TO AN E-MAIL USING A WIRELESS COMMUNICATION DEVICE", the entire disclosure of which is incorporated by reference herein as if being set forth in its entirety.

FIELD OF THE INVENTION

The present invention relates generally to radio and/or wireless communications. In particular, the present invention pertains to a system and method for providing improved electronic mail services to users of a wireless communication device.

BACKGROUND OF THE INVENTION

The advent of wireless personal communications devices has revolutionized the telecommunications industry. Cellular, Personal Communications Service (PCS) and other services provide wireless personal communications to businesses and individuals at home, in the office, on the road, and any other locations the wireless network reaches.

Wireless telephone subscribers no longer have to use pay telephones along the road, or wait until they return home or to the office to check messages and return important business calls. Instead, wireless subscribers carry out their day to day business from their cars, from the jobsite, while walking along the airport concourse, and just about anywhere their signals are accessible.

Thus, it is no surprise that since the introduction of the cellular telephone service, the number of wireless telephone subscribers has increased steadily. Today, the number of wireless telephone subscribers is staggering and still growing rapidly. In fact, many households have multiple wireless telephones in addition to their conventional land-line services.

With a market of this size, there is fierce competition among hardware manufacturers and service providers. In an attempt to lure customers, most providers offer handsets with desirable features or attributes such as small size, light weight, longer battery life, speed dial, and so forth. Many recent additions to the marketplace include multi-functional handsets that even provide pocket-organizer functions and electronic mail (email) and Internet access integrated into the wireless handset. Most manufacturers, however, are still scrambling to add new features to their communication devices to snare a portion of this booming market.

Access to email is an important new feature in wireless handsets today. To use this feature, users dial into their email servers. The email can be read on a small screen on the wireless handset. Alternatively, if the email contains a sound file, or a link to a sound file, the sound file can be played over the speaker(s) of the wireless handset. Users can also reply to email using their wireless handsets. Because of the limited size of these handsets, a method for inputting responses other than the common typing keyboard had to be devised. Typically, letters are input based on the traditional telephone keypad. For example, the letters A, B, and C are input by pushing the "2" pushbutton; D, E, and F are input by pushing the "3" pushbutton, and so on. The multiple letters associated with a single pushbutton are differentiated by pushing the same pushbutton repeatedly. For example, D is input by pushing "2" once, E is input by pushing "2" twice, and F is input by pushing "2" three times. As another example, MIKE would be input by the following series of pushbuttons: 6, 4-4-4, 5-5, 3-3.

This method of inputting typed email content, however, is cumbersome. Given the small keypads included on most wireless communication devices, extensive data input may be time-intensive and may lead to errors in the email content. Accordingly, there is a need for a system and method for providing improved electronic mail services to users of a wireless communication device.

OBJECTS OF THE INVENTION

It is, therefore, an object of the present invention to provide users of a wireless communication device with an improved system and method for using electronic mail with a wireless communication device.

It is another object of the present invention to provide a method for attaching an audio file to an electronic mail message.

Another object of the present invention is to provide a wireless communications system that enables a user of a wireless communication device to attach an audio file to an electronic mail message.

Yet another object of the present invention is to provide a convenient and simple method for sending an electronic mail message with a voice mail attachment.

It is another object of the present invention to provide a method for sending an electronic mail message with an attached digital audio file or a link to a digital audio file.

Another object of the present invention is to provide a multimedia electronic mail system over a wireless communications network.

Additional objects and advantages of the present invention are set forth, in part, in the description which follows and, in part, will be apparent to one of ordinary skill in the art from the description and/or from the practice of the present invention.

SUMMARY OF THE INVENTION

The invention is a system and method directed toward allowing the user of a wireless communication device with email access to send email with a voice mail attachment in the form of a digital audio file or a link to a digital audio file that is sent over the email system.

The wireless handset user can send email that contains an audio file rather than text only. After the user selects to send an audio attachment, the user inputs an audio signal (typically, voice) into the handset microphone. This audio signal is transmitted to the voice mail server. The server converts the voice message to a digital file. After the user is finished transmitting the sound signal, the user can send the newly created digital audio file directly as an attachment to the email, or the user can send a link to the file for streaming web delivery of the file. Then the user can disconnect from the server or select other options. The user can send an audio file attachment to a new email addressee or as a response to an email received by the user. That is, the user can create a new email to be sent and attach an audio file. The user can also send an audio file attachment as a response to an email containing an audio file attachment.

In one embodiment, the present invention is a method for sending an audio file to an electronic mail (email) recipient over a wireless communications network from a user of a wireless communication device. The method may comprise the steps of communicatively connecting to a first server over the wireless communications network; selecting an option to send the audio file to the email recipient; communicatively connecting to a second server over the wireless communications network; recording the audio file on the second server; and sending the audio file to the email recipient.

In another embodiment, the present invention is a multimedia electronic mail (email) system for sending a voice message to an email recipient. The system of the present invention may comprise a wireless communications network capable of supporting audio and data transmission; and a wireless communication device in communication with the wireless communications network, the wireless communication device comprising: a receiver for receiving email text; a display for displaying the email text to a user of the wireless communication device; and audio input/output means for receiving audio input and delivering audio output. The system further comprises converting means for converting the voice message to a digitally stored audio file, wherein the converting means is in communication with the wireless communication device over the wireless communications network; and mailing means for sending the audio file to the email recipient, wherein the mailing means is in communication with the wireless communication device over the wireless communications network.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention, and together with the detailed description serve to explain the principles of the present invention.

BRIEF DESCRIPTION OF THE DRAWINGS

The present invention is described with reference to the accompanying drawings.

DETAILED DESCRIPTION OF THE PREFERRED EMBODIMENTS

Reference will now be made in detail to a preferred embodiment of the multimedia electronic mail (email) system 10 of the present invention, an example of which is illustrated in the accompanying drawings.

Figure 1:
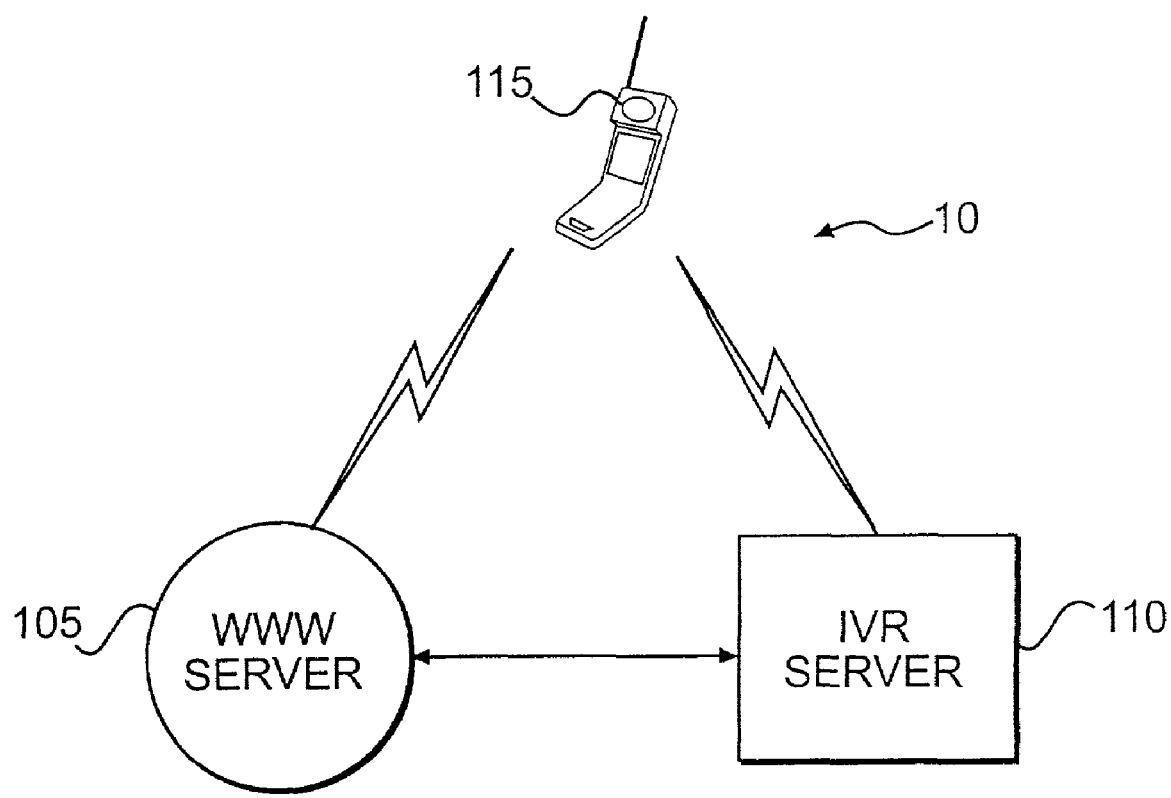
FIG. 1 is a top level block diagram illustrating an example system architecture according to an embodiment of the present invention.

FIG. 1 is a top level block diagram illustrating an example system architecture according to one embodiment of the multimedia email system 10 of the present invention. The multimedia email system 10 includes a wireless communications network (not shown), a World Wide Web (WWW)/Email server 105, an Interactive Voice Response (IVR) server 110, and at least one wireless communication device (WCD) 115.

The WWW/Email server 105 is communicatively coupled with the IVR server 110 and the WCD 115. In one embodiment, the WWW/Email server 105 and the IVR server 110 can be housed in a common platform means, such as, for example, a computer. Alternatively, the WWW/Email server 105 and the IVR server 110 can each reside on a separate computer. The WCD 115 is communicatively coupled with the WWW/Email server 105 and the IVR server 110 over the wireless communications network.

Figure 2:
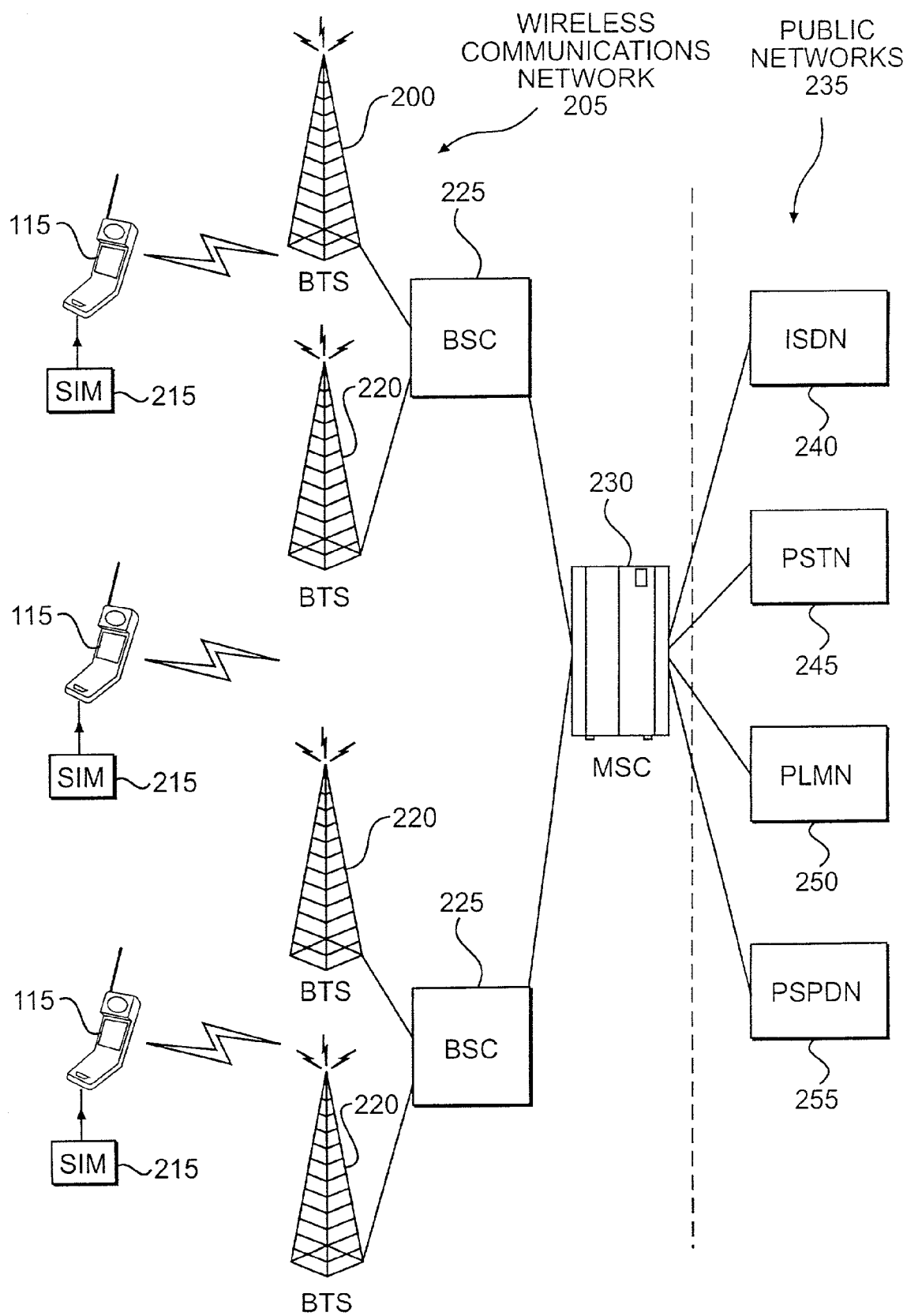
FIG. 2 is a block diagram illustrating an example implementation of a wireless communications network according to an embodiment of the present invention.

FIG. 2 is a block diagram illustrating an example implementation of a wireless communications network 205 according to one embodiment of the present invention. The wireless communications network 205 may comprise at least one base transceiver station (BTS) 220, at least one base station controller (BSC) 225, and at least one mobile switching center (MSC) 230. The WCD 115 may communicate with public networks 235 through the MSC 230 of the wireless communications network 205. Examples of the public networks 235 that the MSC 230 may interface with include, but are not limited to, an Integrated Services Digital Network (ISDN) 240, a Public Switched Telephone Network (PSTN) 245, a Public Land Mobile Network (PLMN) 250 and a Packet Switched Public Data Network (PSPDN) 255. The wireless communications network 205 may comprise a cellular network, a GSM network, a PCS network, or any other wireless or radio communication network.

Generally, the WCD 115 is the mobile equipment or phone carried by a user of the wireless communications network 205. The BTS 220 interfaces with multiple WCDs 115 and manages the radio transmission paths between the WCDs 115 and the BTS 220. The BSC 225 manages the communication flow between a WCD 115 and the multiple BTSs 220. For example, the BSC 225 handles communication traffic with the MSC 230. As described above, the MSC 230 may interface with a plurality of public networks 235.

The WCD 115 can communicate with the BTS 220 using a standardized radio air interface, colloquially referred to as the "Urn" interface. The BTS 220 is typically within a geographic area known as a "cell" and handles communications for all wireless devices within the cell. The BTS 220 is usually in the center of the cell and consists of one or more radio transceivers with an antenna. The BTS 220 establishes radio links and handles radio communications over the Urn interface with the WCDs 115 within the cell. The transmitting power of the BTS 220 defines the size of the cell. Each BSC 225 can manage multiple (as many as hundreds) of the BTSs 220. The BTS/BSC communication may take place over a standardized interface, which is specified by the industry to be standardized for all manufacturers. The BSC 225 may allocate and manage radio channels and control the handover of calls between the BTSs 220.

The BSCs 225 communicate with the MSC 230 over a standardized interface. The MSC 230 may manage communications between two mobile subscribers at separate WCDs 115. Additionally, the MSC 225 may manage communications between mobile subscribers at a WCD 115 and a second party in one of the public networks 235. Details of the wireless communication network 205 are presented for illustrative purposes only and implementation of the invention is not dependent on any particular wireless communication network.

Figure 3:
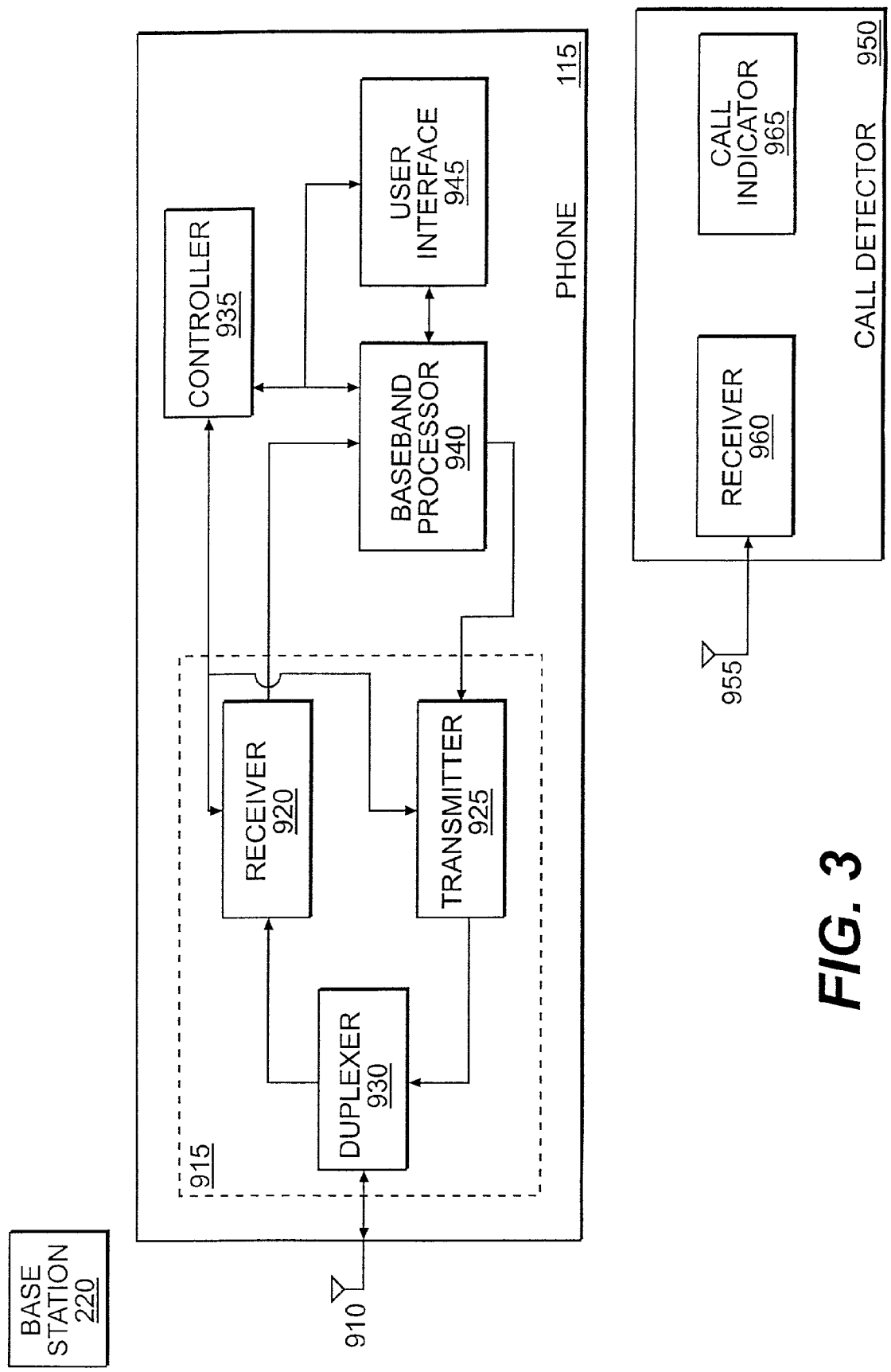
FIG. 3 is a block diagram of a wireless handset mobile telecommunication device and base station according to an embodiment of the present invention.

One embodiment of the WCD 115 and the BTS 220 is illustrated in FIG. 3. In the preferred embodiment, the WCD 115 is a wireless phone. The WCD 115 may comprise a Code Division Multiple Access (CDMA) phone, a cdma2000 phone, a 3G phone, a Time Division Multiple Access (TDMA) phone, and/or any other wireless communication device suitable for voice and data communication over the wireless communications network 205. The WCD 115 typically includes an antenna 910, a transceiver 915, a baseband processor 940, a controller 935, and a user interface 945. As discussed, the WCD 115 is configured to communicate with other communications devices, such as the BTS 220.

The transceiver 915 includes a transmitter 925 that transmits voice and data information via the antenna 910 to a recipient communication device such as, for example, a BTS 220. The transceiver 915 also includes a receiver 920 that receives voice and data information from another communication device (e.g., BTS 220). The received voice and data information is provided to the user or used to facilitate device operation.

In one embodiment, the multimedia email system 10 further includes a call detector 950, as shown in FIG. 3. In the preferred embodiment, the call detector 950 is a caller ID system used to identify the user of the WCD 115. The call detector 950 includes an antenna 955 for transmitting and receiving caller identification information, a receiver 960 for receiving voice and data information from another communication device, and a call indicator 965, such as, for example, an LED screen, for indicating the information about the incoming call. In the preferred embodiment, the call detector 950 is part of the IVR server 110. Alternatively, the call detector 950 may be housed separate from, but in communication with, the IVR server 110.

Figure 11:
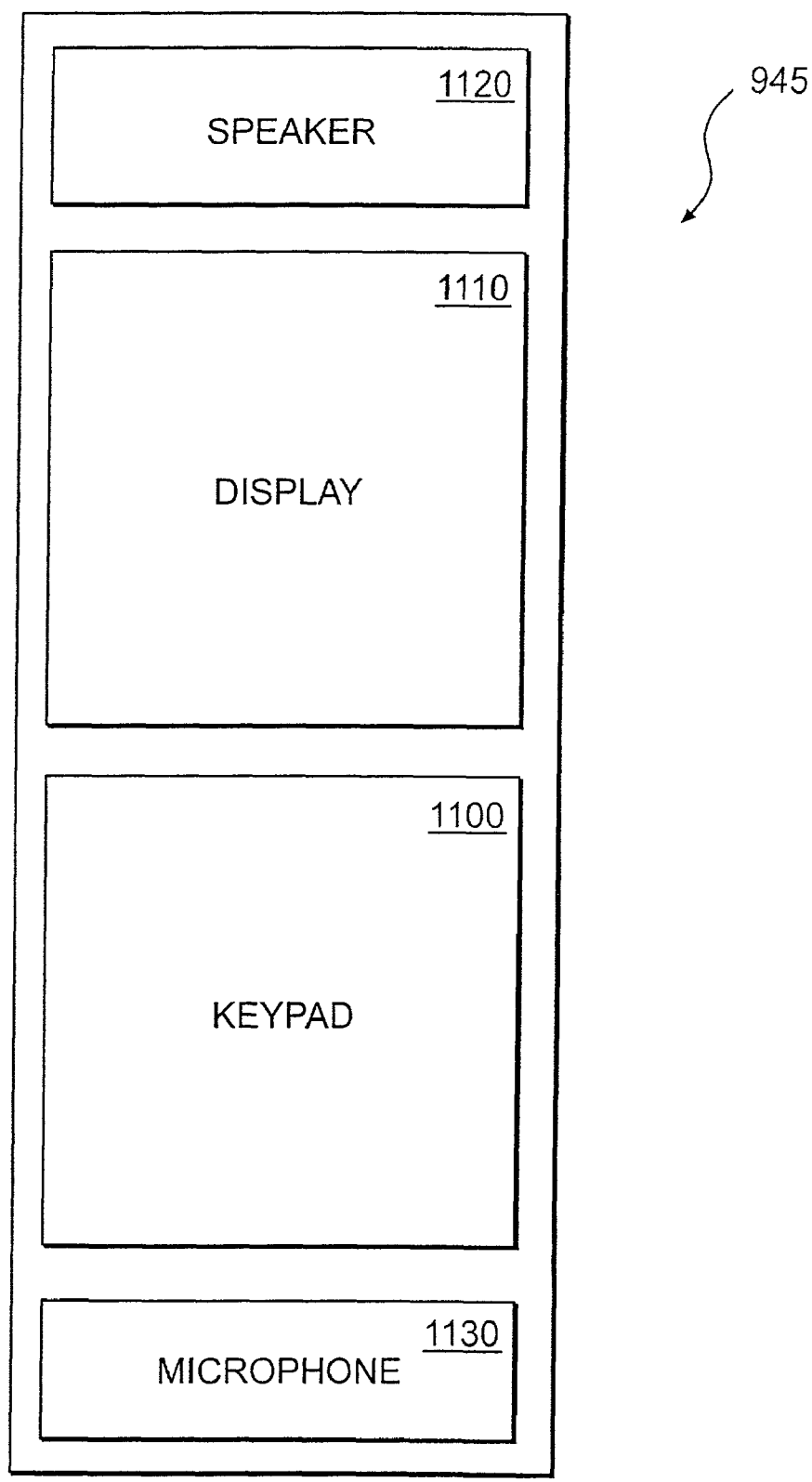
FIG. 11 is a block diagram of a user interface for a wireless communication device according to an embodiment of the present invention.

An embodiment of the user interface 945 of the WCD 115 is shown in FIG. 11. Typically, the user interface 945 will include a keypad 1100 for controlling the device and data entry, a display 1110 for displaying relevant information to the user, a microphone 1130 for receiving audio input, and a speaker 1120 for delivering audio output, as shown in FIG. 11. The microphone 1130 accepts voice or other audio input from the user and converts this information into electrical signals that can be transmitted by the transceiver 915. Likewise, the speaker 1120 converts electrical signals received by the transceiver 915 into audio information that can be heard by a user of the WCD 115. The display 1110 shows information such as call information, email text information, keypad entry information, signal presence and strength information, battery life information, or any other information useful to the user. The WCD 115 and the display 1110 may be adapted to present text to the user by means of a wireless markup language, such as, for example, wireless application protocol (WAP) and/or handheld device markup language (HDML). The display 1110 preferably takes the form of a liquid crystal display (LCD), which has low power consumption characteristics, but could also be implemented as a light emitting diode (LED) display or any other appropriate visual indicator.

The keypad 1100 typically includes an alphanumeric keypad and may also include special function keys. In one embodiment, the keypad 1110 is backlit to permit viewing of the keys in low light or dark conditions. The WCD 115 may also include a flip panel (not shown) that can be closed to conceal some or all of the keypad 1100.

The user utilizes the user interface 945 to generate information to be transmitted back to the other party to the communication link. The user interface 945 transforms the user input into electrical signals to be used by the WCD 115. The transformed electrical signals are coupled from the user interface 945 to the baseband processor 940, as shown in FIG. 3. The baseband processor 940 formats the electrical signals. The baseband processor 940 may filter, amplify, and modulate the user signals into specified formats. The formatted signals are then coupled to the transmitter 925.

The transmitter 925 filters, amplifies, and converts the signal. The transmitter 925 then couples the resultant RF signal to the duplexer 930, which couples the signal to the antenna 910. The transmitted signal then propagates from the antenna 910 to the BTS 220.

A power source (not shown) provides power to the various components of the WCD 115. Any suitable power source may be utilized, but a rechargeable lithium ion battery is preferable. In one embodiment, the battery is implemented as an easily removable and exchangeable battery pack. Power may also be provided by an external cable that plugs into a mating slot in the WCD 115, either to recharge the battery or to act independently as a power source.

The WCD 115 may further include a subscriber identity module (SIM) 215, as shown in FIG. 2. The SIM 215 may be a memory device that stores identification information about the subscriber of the multimedia email system 10 and/or the WCD 115. The SIM 215 may be implemented as a smart card or as a plug-in module that activates service from any WCD 115. Among the information stored on the SIM 215 may be a unique International Mobile Subscriber Identity (IMSI) that identifies the subscriber to wireless communication network 205, and an International Mobile Equipment Identity (IMEI) that uniquely identifies the mobile equipment. Alternatively, a unique identifier for the mobile WCD 115 may be the telephone number for the WCD 115. Other information, such as, for example, a personal identification number (PIN) and billing information, may be stored on the SIM 215.

Figure 4:
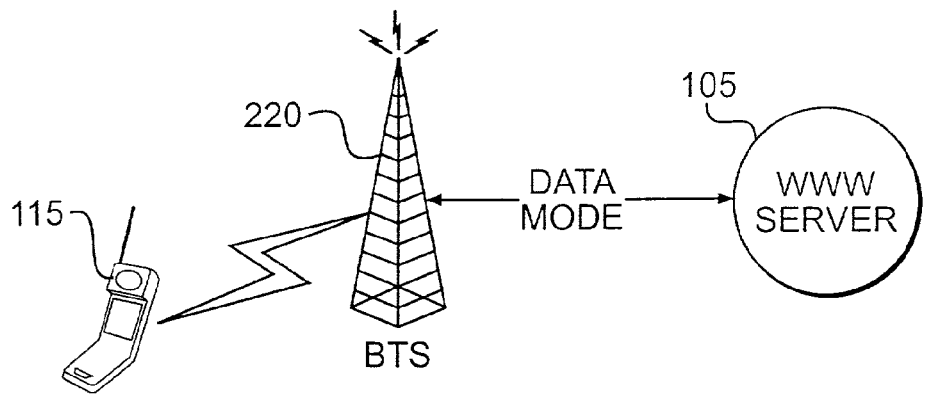
FIG. 4 is a top level block diagram of a conventional wireless Web architecture as presently known in the art.

FIG. 4 is a top level block diagram of a conventional wireless Web architecture as presently known in the art. The WCD 115 is connected to the WWW/Email server 105 through a wireless communications network including a BTS 220. The WCD 115 communicates with the WWW/Email server 105 in data mode, which allows for the exchange of data in discrete packets.

Figure 5:
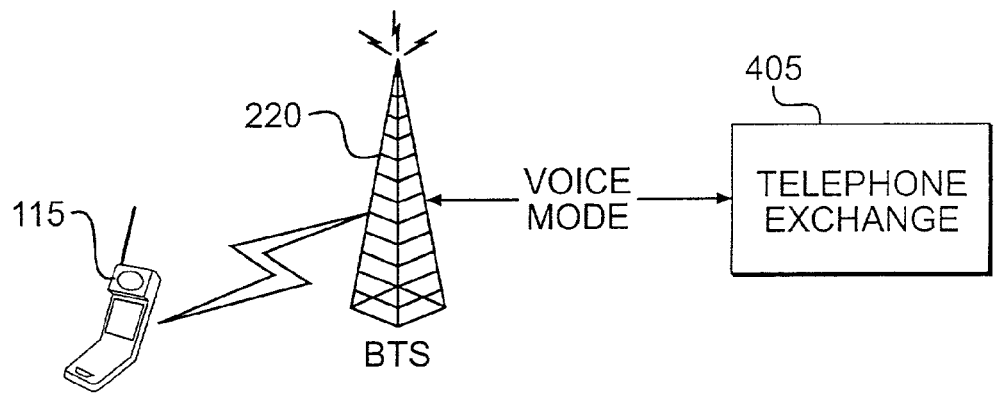
FIG. 5 is a top level block diagram of a conventional wireless telephone architecture as presently known in the art.

FIG. 5 is a top level block diagram of a conventional wireless telephone architecture as presently known in the art. The WCD 115 is connected to a telephone exchange 405 through a wireless communications network including a BTS 220. The WCD 115 communicates through the telephone exchange 405 in voice mode, which provides a dedicated circuit for audio communications between the WCD 115 and the device with which it is temporarily connected.

Figure 6:
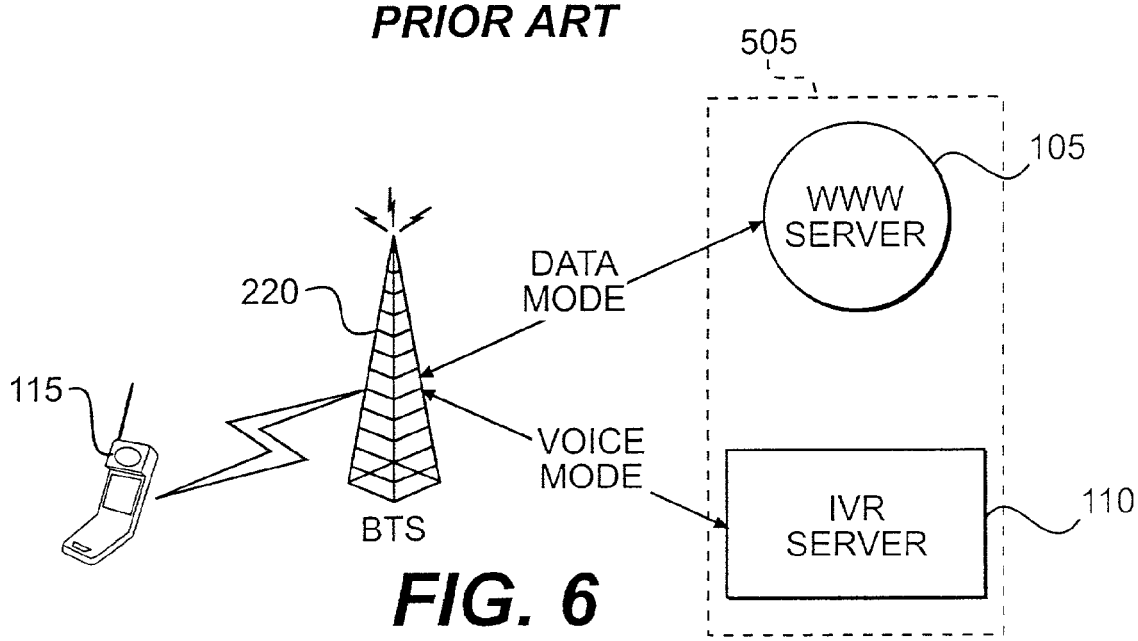
FIG. 6 is a block diagram illustrating a system architecture according to an embodiment of the present invention.

FIG. 6 is a block diagram illustrating an example architecture for attachment of a voice message to an email message sent with the WCD 115 according to an embodiment of the present invention. The WCD 115 is connected to the WWW/Email server 105 through the wireless communications network 205, including the BTS 220. The WCD 115 communicates with the WWW/Email server 105 in data mode, which allows the user of the WCD 115 to navigate through an electronic mail account provided by the server. When the user of the WCD 115 selects an option for attaching a voice file to an electronic mail, the WCD 115 disconnects from the WWW/Email server 105 and connects to the IVR server 110. The connection between the WCD 115 and the IVR server 110 is in voice mode, which provides a dedicated circuit for audio communication between the WCD 115 and the IVR server 110. As previously mentioned, the WWW/Email server 105 and the IVR server 110 may be housed together in a single unit 505.

Figure 7:
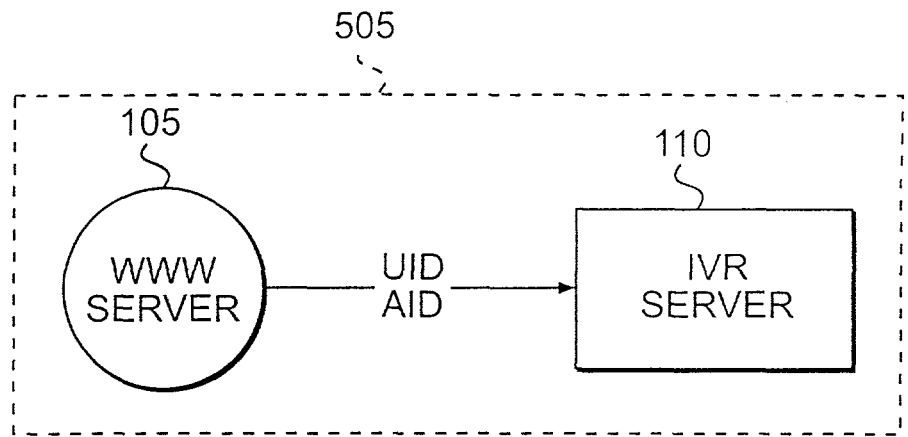
FIG. 7 is a block diagram illustrating an example communication flow between components of the system architecture according to an embodiment of the present invention.

FIG. 7 is a block diagram illustrating an example communication flow between components of an architecture for sending an audio attachment to an email on the WCD 115 according to one embodiment of the present invention. Once the WWW/Email server 105 instructs the WCD 115 to disconnect and connect to the IVR server 110, the WWW/Email server 105 notifies the IVR server 110 of the pending connection with the WCD 115. To notify the IVR server 110, the WWW/Email server 105 sends certain information to the IVR server 110. For example, the WWW/Email server 105 may send information that uniquely identifies the WCD 115 by its user identification (UID). In one embodiment, the UID may be the telephone number for the WCD 115.

Communication between the WWW/Email server 105 and the IVR server 110 can be direct inter-process communication or network based communication. For example, if the WWW/Email server 105 and the IVR server 110 are housed in a single computer 505, then inter-process communication may be advantageously used by the WWW/Email server 105 to notify the IVR server 110 of the pending connection from WCD 115.

In addition to passing the UID, the WWW/Email server 105 can also pass a command to the IVR server 110 to record an audio file from the WCD 115. In this manner, when the IVR server 110 receives the connecting call from the WCD 115, it informs the user that it is ready to record the audio file for attachment.

Figure 8:
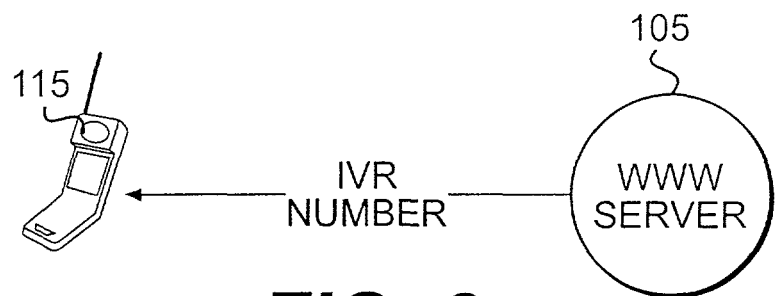
FIG. 8 is a block diagram illustrating an example communication flow between components of an architecture for providing audio items to a wireless (device according to an embodiment of the present invention.

FIG. 8 is a block diagram illustrating an example communication flow between components of an architecture for providing audio to the WCD 115 according to one embodiment of the present invention. Once the user of the WCD 115 has selected the option for an audio attachment to an electronic mail, the WWW/Email server 105 instructs the WCD 115 to terminate the data mode connection and establish a voice mode connection with the IVR server 110 (not pictured). The WWW/Email server 105 may accomplish this by passing data to the WCD 115. In one embodiment, the data passed to the WCD 115 by the WWW/Email server 105 includes a telephone number for the IVR server 110. In one embodiment of the present invention, the WCD 115 then automatically connects with the IVR server 110. In an alternative embodiment, the user of the WCD 115 uses the information contained in the data passed to the WCD 115 by the WWW/Email server 105 and manually connects with the IVR server 110.

Figure 9:
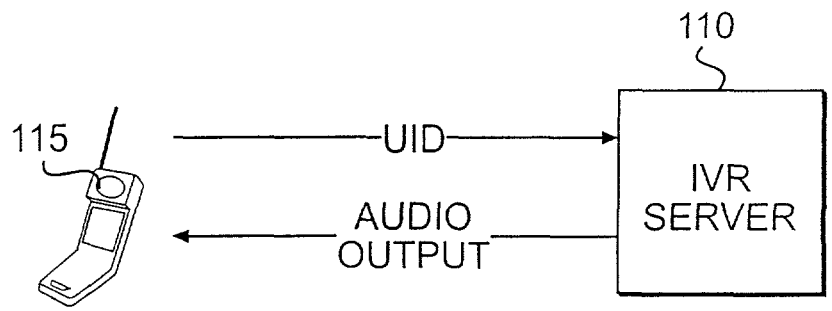
FIG. 9 is a block diagram illustrating an example communication flow between components of the system architecture according to an embodiment of the present invention.

FIG. 9 is a block diagram illustrating an example communication flow between components of an architecture for sending an audio attachment to an email on the WCD 115 according to one embodiment of the present invention. Once the WCD 115 has disconnected from the WWW/Email server 105 (not pictured), it can connect to the IVR server 110. When connecting to the IVR server 110, the WCD 115 passes a user identification (UID) to the IVR server 110. In one embodiment, the UID allows the IVR server 110 to uniquely identify the WCD 115.

For example, the UID can be the unique telephone number assigned to the WCD 115. When the WCD 115 connects with the IVR server 110, it passes the UID to the IVR server 110. Based on the information received from the WWW/Email server 105, the IVR server 110 expects to record an audio input from the WCD 115.

Figure 12:
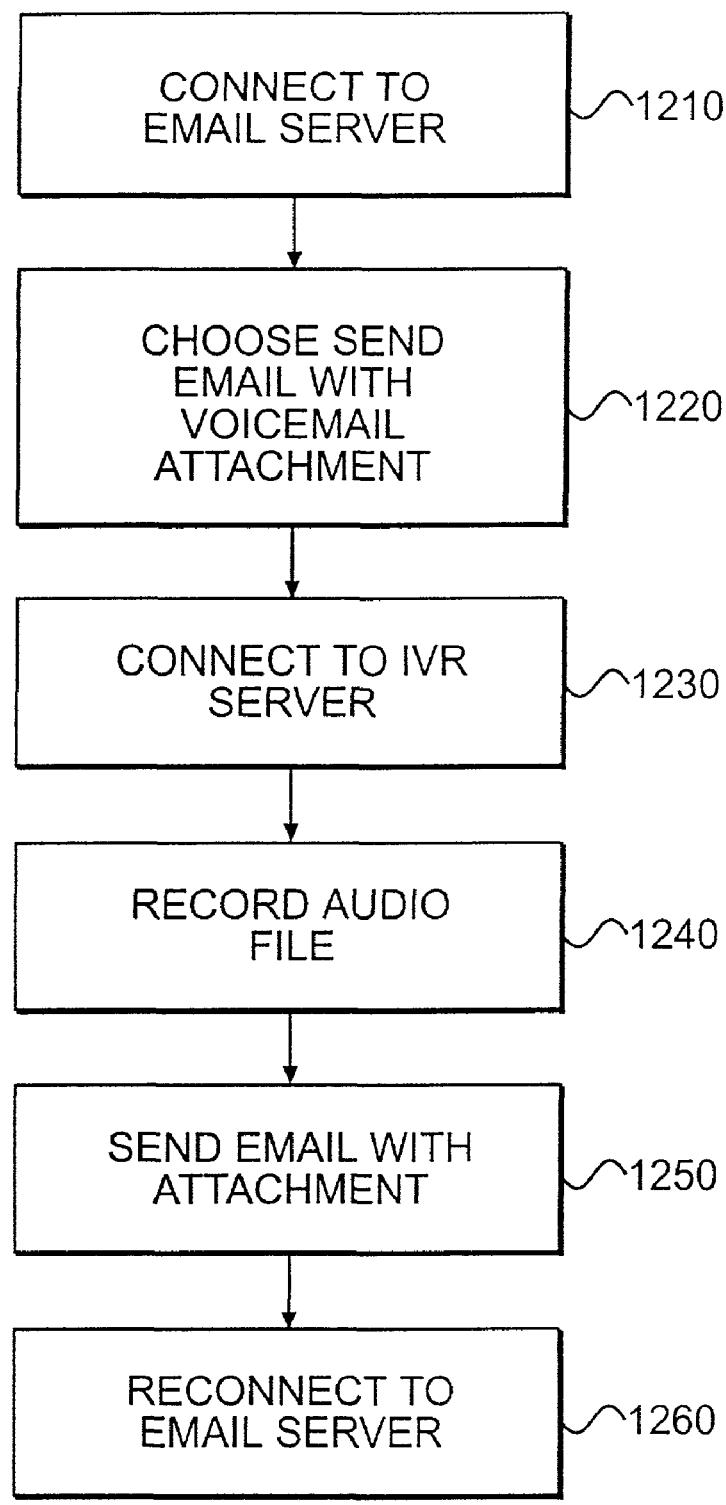
FIG. 12 is a block diagram illustrating a general process flow according to an embodiment of the present invention.

FIG. 12 is a general flow diagram illustrating a preferred embodiment of the method of the present invention. FIGS. 10a-d form a detailed flow diagram illustrating a preferred embodiment of the present invention.

With reference to FIG. 12, the user of the WCD 115 connects to the WWW/Email Server 105, as shown in step 1115, and described in connection with FIGS. 1, 6, 7, and 8. In step 1220, a user may choose to send an email file with a voicemail audio attachment. In step 1230, the WCD 115 connects to the IVR Server 110, as described in connection with FIGS. 1, 6, 7 and 9. In step 1240, the IVR records the audio input and stores it as an audio file. In step 1250, the WWW/Email Server 105 attaches the audio file to the email and sends the email. In step 1260, the WCD 115 reconnects to the WWW/Email Server. This is a general description of the flow of the present invention.

Figure 10A:
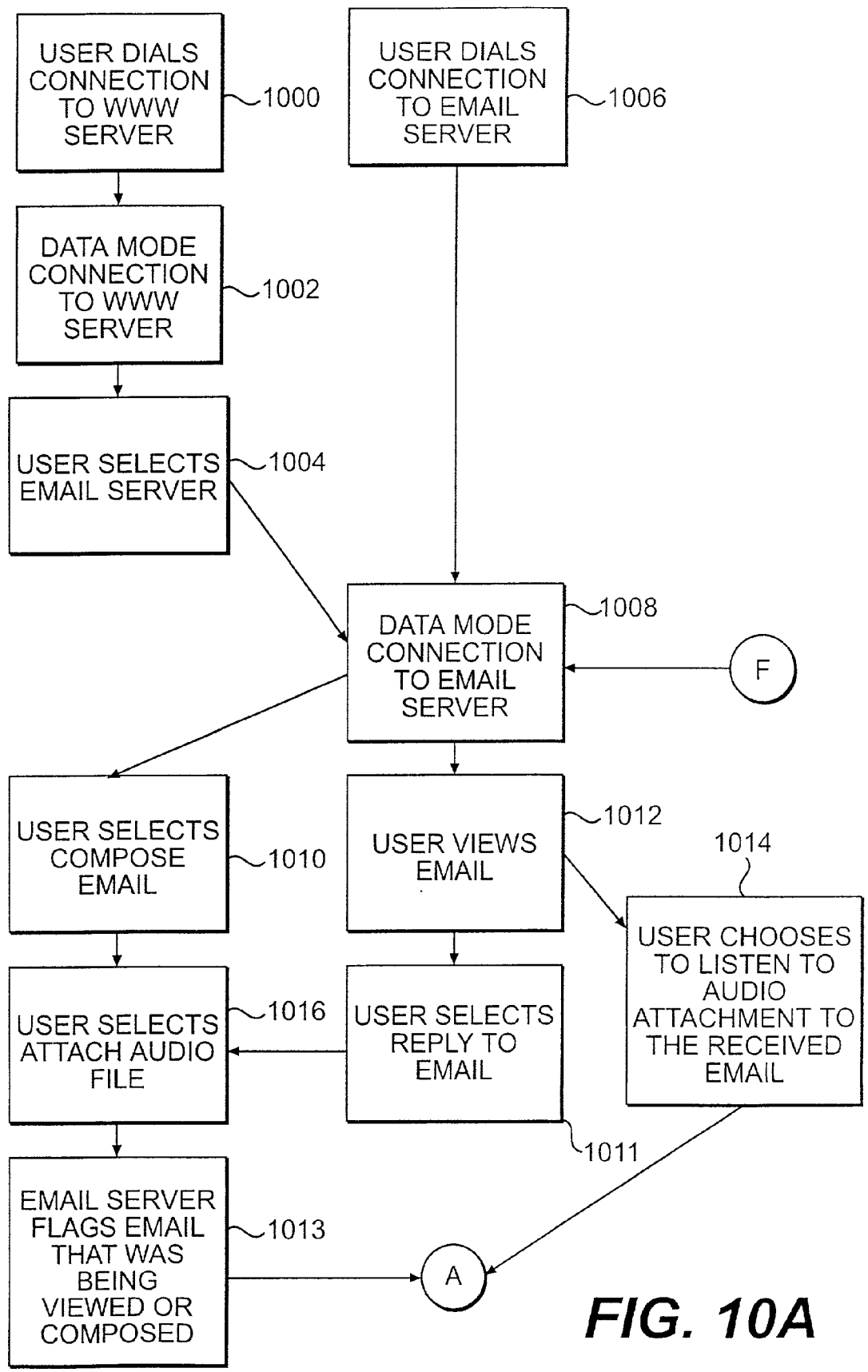
FIGS. 10a-d are block diagrams illustrating a detailed process flow according to an embodiment of the present invention.

A more detailed description of the flow of the present invention will now be explained, with reference to FIGS. 10.a-d. With reference to FIG. 10a, steps 1000 to 1008 show typical ways that the user may choose to communicatively connect to the WWW/Email Server 105 by means of the WCD 115. In step 1000, the user dials the number on the WCD 115 to make a connection to the WWW server of the WWW/Email server 105. In step 1002, a data mode connection is made between the WCD 115 and the WWW Server. In step 1004, the user selects an option for connecting to an Email Server of the WWW/Email server 105. This establishes a data mode connection with the Email Server, as shown in step 1008. Alternatively, as shown in step 1006, the user may dial the number for a connection to the Email Server directly. This also establishes a data mode connection with the Email Server, as shown in step 1008. In the preferred embodiment, the data mode connection may be the same data mode connection as that employed for the connection to the WWW Server. It is contemplated that the WWW server and the Email server may reside separately or may be part of the same server, and are collectively referred to as the WWW/Email server 105.

Steps 1010 to 1016 show typical ways that the user may select an option to attach an audio file to an email to be sent, as shown generally in step 1220 of FIG. 12. With continued reference to FIG. 10a, in step 1010, the user selects an option to compose a new email. In step 1016, the user selects an option to attach an audio file to the email. In step 1013, the email Server 105 flags the email that was being composed.

Alternatively, as shown in step 1012, the user may choose to view a received email. In step 1011, the user selects an option to respond to the email. Then, in step 1016, the user may choose to attach an audio file to the response to the received email. In step 1013, the email Server 105 flags the email that was being viewed. In the alternative, after viewing a received email, as shown in step 1012, the user may choose to listen to an audio attachment to the received email, as shown in step 1014.

Next, the WCD 115 must connect to the IVR server 110, as shown generally in step 1230 of FIG. 12. This step is shown in more detail in steps 1018 to 1026 of FIG. 10b. In step 1018, the Email Server 105 sends a command to the WCD 115 to disconnect from the Email Server 105 and connect to the IVR Server 110. The command also may contain a telephone number for the connection to the IVR server 110. In step 1020, the Email Server 105 sends a command to the IVR Server 110 to prepare for the call from the WCD 115. The command may also contain a number identifying the WCD 115. Preferably, the number is the telephone number of the WCD 115. In step 1022, the WCD 115 terminates the data mode connection with the Email Server 105. In step 1024, the WCD 115 dials the number to connect to the IVR Server 110, making an audio mode connection. In step 1026, the WCD 115 stores state information telling itself to reconnect to the WWW/Email Server 105 after it disconnects from the IVR Server 110.

Figure 10B:
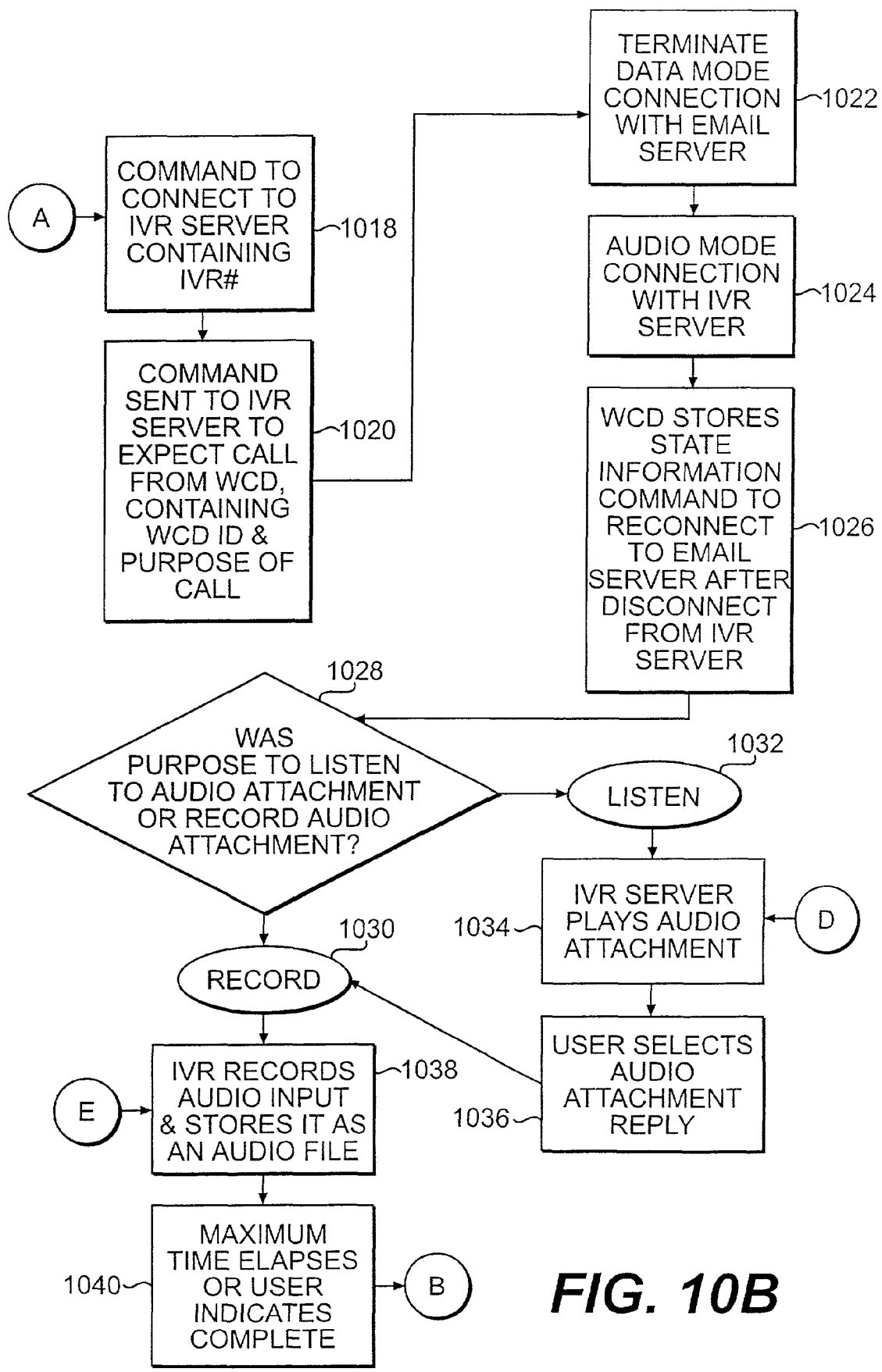

Steps 1028 to 1048 show, in detail, the processes which may lead to recording of the audio file. The process of recording the audio file is shown, generally, in step 1240 of FIG. 12. With reference to FIG. 10b, in step 1028, the IVR Server 110 answers the question whether the purpose of this connection was to listen to an audio attachment to a received email (step 1014) or to record an audio attachment for an email to be sent (step 1016). The purpose was sent by the Email Server 105 in step 1020.

As shown in step 1030, the purpose may be to record an audio attachment to an email to be sent. In this instance, the IVR Server 110 records audio input and stores it as an audio file. Then, as shown in step 1040, the user indicates that the audio input is complete, or a maximum time elapses.

In the alternative, as shown in step 1032, the purpose may be to listen to an audio file attached to a received email. In step 1034, the IVR Server 110 plays the audio file on the WCD 115 for the user. The user may then choose, as shown in step 1036, to reply with an email having an audio file attachment. In this case, and if the purpose was to record an audio file attachment for an email to be sent, the IVR Server 110 records the audio input from the user, converting it and storing it as a digital audio file, as indicated by step 1038. It is contemplated that the audio file may comprise a .wav file, a streaming audio file, or any other suitable audio medium adapted for storing on the IVR server 110 and delivery over the wireless communications network 205.

Figure 10C:
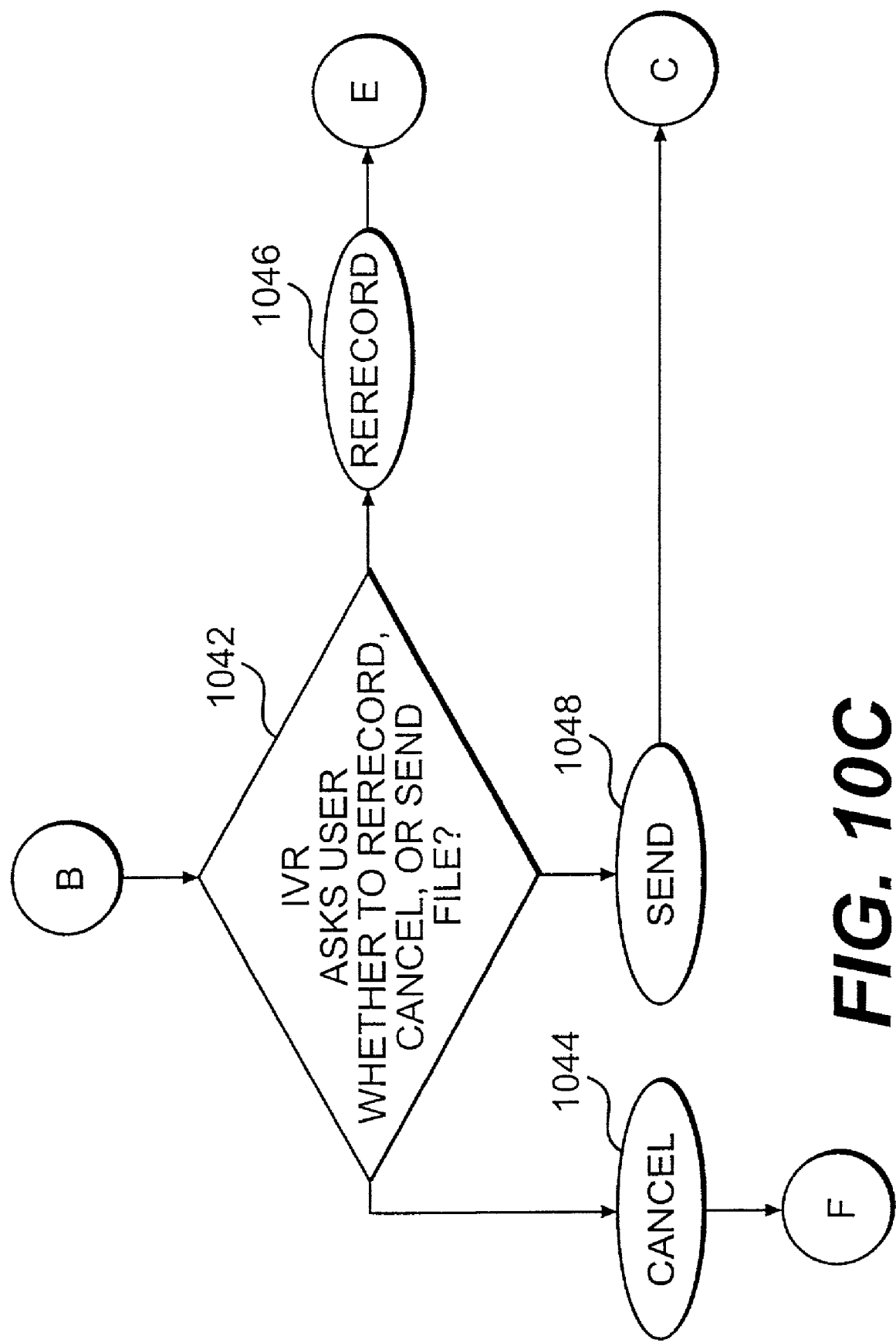

As shown in FIG. 10c, in step 1042, the IVR Server 110 asks the user whether they wish to re-record the audio file attachment, cancel, or send the email with the audio file attachment. If the user selects to re-record, as shown in step 1046, the flow returns to step 1038. If the user chooses to cancel, as shown in step 1044, the flow returns to step 1008. If the user chooses to send the email with the audio file attachment, as shown in step 1048, the process of recording the audio file attachment, step 1240 of FIG. 12, is complete, and the process flow continues to step 1050.

Figure 10D:
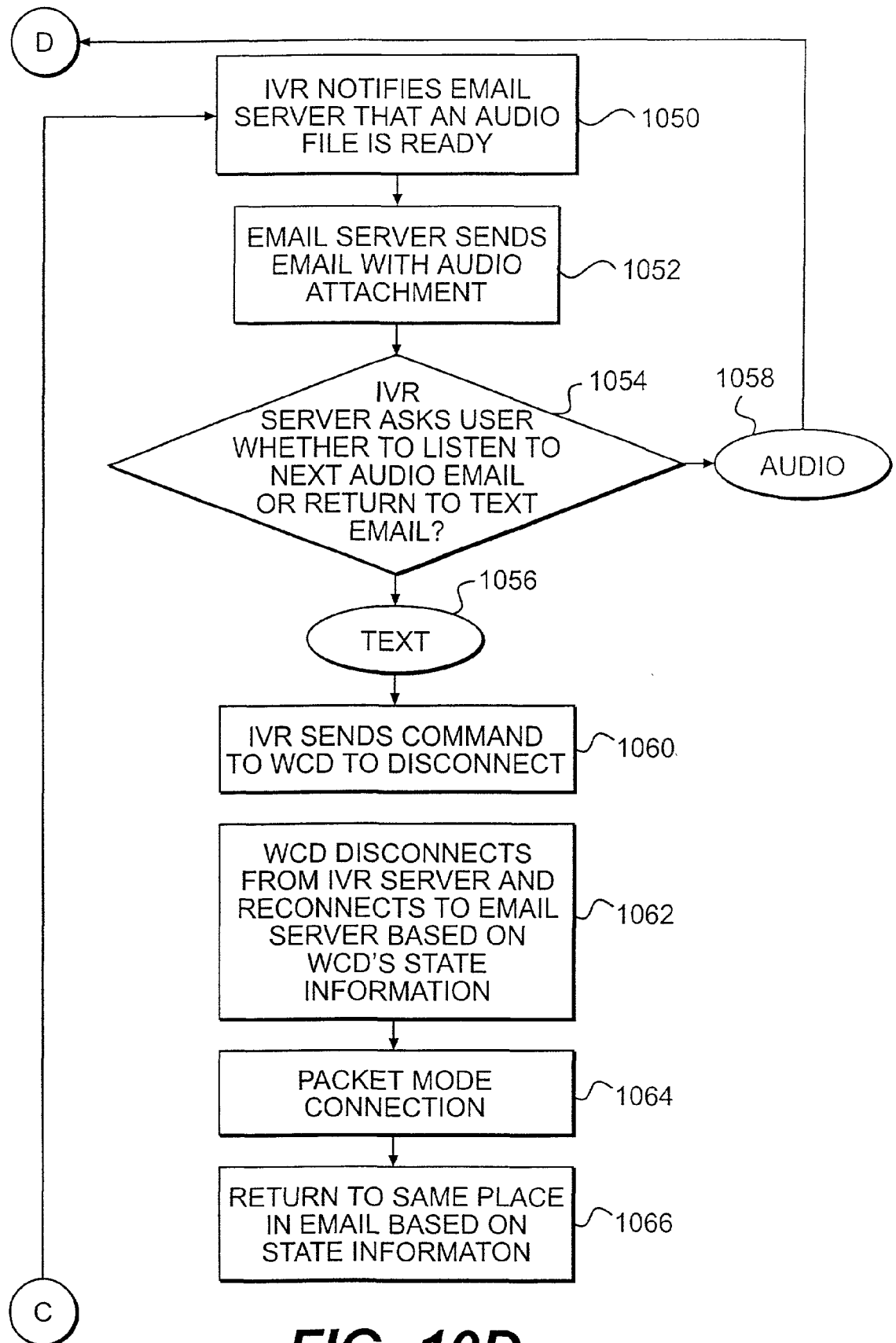

Steps 1050 to 1052 show, in detail, a process for sending the email with the audio file attachment. This process is shown generally in step 1250 of FIG. 12. With reference to FIG. 10d, in step 1050, the IVR Server 110 notifies the WWW/Email Server 105 that an audio file is ready for attachment to an email. The notification may also contain an identification indicating which WCD 115 this audio file is for. The identification is preferably the telephone number of the WCD 115. In step 1052, the WWW/Email Server 105 attaches the audio file from step 1038 to the email flagged in step 1013, and sends the email. In the alternative, the attachment of the audio file in step 1052 may include sending a hyperlink to the audio file stored in a database on the IVR Server 110. It is contemplated that, if more than one email was flagged in step 1013, the WWW/Email Server 105 may prompt the user with the option of selecting to which electronic text mail message the audio file or hyperlink should be attached.

Steps 1054 to 1066 show a detailed flow process of how the WCD 115 reconnects to the WWW/Email Server 105. This process is shown generally in step 1260 of FIG. 12.

With continued reference to FIG. 10d, in step 1054 the IVR Server 110 asks the user whether the user wishes to listen to the next audio file attached to an email or return to viewing text email. If the user selects an option for listening to another audio file attached to an email, as shown in step 1058, the flow returns to step 1034. If the user selects an option for returning to viewing text email, as shown in step 1056, the IVR Server 110 sends a command to the WCD 115 to disconnect from the IVR Server 110, as shown in step 1060. Then, as shown in step 1062, the WCD 115 disconnects from the IVR Server 110 and reconnects to the WWW/Email Server 105, based on its saved state information from step 1026. This creates a data packet mode connection, as shown in step 1064. In step 1066, the WWW/Email Server 105 returns the user to the same place in the user's email accounts as where the user left off from steps 1010, 1012, or 1014. For example, the user may have folders in the user's email account, and the user may return to viewing the same folder that the user was using in steps 1008, 1010, 1012, or 1014.

It will be apparent to those skilled in the art that various modifications and variations can be made in the construction, configuration, and/or operation of the present invention without departing from the scope or spirit of the invention. For example, in the embodiments mentioned above, various changes may be made to the WWW/Email server, the IVR server, the wireless communication device, and the wireless communications network without departing from the scope and spirit of the invention. Moreover, it may be appropriate to make additional modifications or changes to the method of attaching a voice message to an email message without departing from the scope of the invention. Thus, it is intended that the present invention cover the modifications and variations of the invention provided they come within the scope of the following claims and their equivalents.

What is claimed:

1. A method for sending an audio file to an electronic mail (email) recipient over a wireless communications network from a user of a wireless communication device, the method comprising:

communicatively connecting to a first server over the wireless communications network;

receiving input from the user selecting an option presented by the first server to send the audio file to the email recipient;

terminating the connection with the first server and establishing an audio connection between the wireless communication device and a second server over the wireless communications network in response to the selected option, wherein the first server transmits a signal to the second server indicating a pending connection with the wireless communication device, the signal including information identifying the wireless communication device;

recording the audio file on the second server;

reconnecting, by the wireless communication device, to the first server; and sending the recorded audio file to the email recipient as part of an email message;

wherein the wireless communication device stores a set of state information, the state information comprising a status of an interaction between the wireless communication device and the first server for allowing the wireless communication device to return to a same state in the first server that existed prior to terminating the connection.

2. The method of claim 1, wherein the step of communicatively connecting to a first server further comprises:
dialing a phone number for connecting to the first server using the wireless communication device; and
establishing a data packet connection between the wireless communication device and the first server.

3. The method of claim 1, wherein receiving input from the user selecting an option to send the audio file further comprises:
receiving input from the user selecting an option to compose a new email message; and
receiving input from the user selecting an option to attach the audio file to the new email message.

4. The method of claim 1, wherein receiving input from the user selecting an option to send the audio file further comprises:
presenting a received email message on the wireless communication device;
receiving input from the user selecting an option to respond to the received email message; and
receiving input from the user selecting an option to attach the audio file to the response to the received email message.

5. The method of claim 1, wherein the signal further includes user identification information.

6. The method of claim 1, wherein the recording the audio file comprises:
providing an audio input through the wireless communication device; and
storing the audio input as an audio file on the second server.

7. The method of claim 6, further comprising providing the user with at least one option, the option selected from the group consisting of:
re-recording the audio file and canceling the recording.

8. The method of claim 1, wherein the sending the audio file to the email recipient further comprises:
transmitting a signal to the first server indicating that the audio file is ready to be sent;
attaching the audio file to an electronic mail message; and
sending the electronic mail message to the email recipient.

9. The method of claim 1, wherein the reconnecting to the first server comprises providing the user with a plurality of options selected from the group consisting of:
listening to a second audio file stored on the second server and reconnecting to the first server.

10. The method of claim 1, wherein the first server comprises an email server.

11. The method of claim 1, wherein the second server comprises an interactive voice response server.

12. The method of claim 1, wherein the first and second servers are connected by common platform means.

13. The method of claim 1, wherein the audio file comprises a .wav file.

14. The method of claim 1, wherein the sending the audio file to the email recipient comprises sending a hyperlink to the audio file stored on the second server.

15. A method for sending a message to an electronic mail (email) recipient over a wireless communications network from a wireless communication device, comprising:
connecting the wireless communication device to an email server by a data packet connection over the wireless communication network;
receiving input selecting an option presented by the email server to send a voice message to the email recipient;
terminating the connection between the wireless communication device and the email server, and establishing an audio connection between the wireless communication device and an interactive voice response server over the wireless communication network in response to the selected option, wherein the email server transmits a signal to the interactive voice response server indicating a pending connection with the wireless communication device, the signal including information identifying the wireless communication device;
recording the voice message on the interactive voice response server;
reconnecting, by the wireless communication device, to the email server; and
sending the recorded voice message in an attachment to an email to the email recipient;
wherein the wireless communication device stores a set of state information, the state information comprising a status of an interaction between the wireless communication device and the email server for allowing the wireless communication device to return to a same state in the email server that existed prior to terminating the connection.

16. A method of sending an audio message in association with an electronic mail (email) message, the method comprising:
providing a wireless communication device with access to an email message over a data connection between the wireless communication device and an email server;
receiving input from the wireless communication device selecting an option to associate an audio file with the email message;
terminating the data connection between the wireless communication device and the email server, and instructing the wireless communication device to connect to a voice server over an audio connection;
transmitting a signal to the voice server indicating a pending connection with the wireless communication device, wherein the signal includes information uniquely identifying the wireless communication device;
receiving input from the voice server indicating that the audio file is available;
reconnecting, by the wireless communication device, to the email server; and
transmitting a representation of the audio file as part of the email message;
wherein the wireless communication device stores state information comprising a status of an interaction between the wireless communication device and the email server for allowing the wireless communication device to return to a same state in the email server that existed prior to terminating the data connection.

17. The method of claim 16, wherein the email message comprises a new email message.

18. The method of claim 16, wherein the information uniquely identifying the wireless communication device comprises a telephone number corresponding to the wireless communication device.

19. The method of claim 16, wherein the representation of the audio file comprises a link to the audio file stored on the voice server.

20. The method of claim 16, wherein instructing the wireless communication device to connect to a voice server further comprises:
transmitting to the wireless communication device a telephone number corresponding to the voice server.

21. The method of claim 16, wherein receiving input from the voice server indicating that the audio file is available further comprises:

receiving information identifying the wireless communication device with which the audio file is associated.

22. The method of claim 21, wherein the information identifying the wireless communication device with which the audio file is associated comprises a telephone number corresponding to the wireless communication device.

23. A system comprising:

an electronic mail (email) server configured to transmit an audio file in association with an email message;

an interactive voice response server configured to generate audio files in response to audio input; and a wireless communication device including processor electronics configured to perform operations comprising:

accessing the email message on the email server over a data connection with the email server;

transmitting to the email server an indication to associate the audio file with the accessed email message;

terminating the data connection with the email server and establishing an audio connection with the interactive voice response server, wherein the wireless communication device stores state information representing a status of an interaction between the wireless communication device and the email server for allowing the wireless communication device to return to a same state in the email server that existed prior to terminating the data connection;

communicating audio input corresponding to the audio file to the interactive voice response server; and reconnecting to the email server before the email message and the associated audio file are transmitted;

wherein the email server is configured to transmit a signal to the interactive voice response server indicating a pending connection with the wireless communication device, the signal including information uniquely identifying the wireless communication device.

24. The system of claim 23, wherein the email server is further configured to receive the audio file from the interactive voice response server and transmit the audio file in association with the accessed email message.

* * * * *

UNITED STATES PATENT AND TRADEMARK OFFICE
CERTIFICATE OF CORRECTION

| | | |
|---|---|---|
| PATENT NO. | : 7,904,516 B2 | Page 1 of 1 |
| APPLICATION NO. | : 09/881671 | |
| DATED | : March 8, 2011 | |
| INVENTOR(S) | : Vincent Chern | |

It is certified that error appears in the above-identified patent and that said Letters Patent is hereby corrected as shown below:

In Fig. 10C, Sheet 8 of 11, for Tag "1042", in Line 3, please delete "RERECORD," and insert -- RE-RECORD, --, therefor.

In Fig. 10C, Sheet 8 of 11, for Tag "1046", in Line 1, please delete "RERECORD" and insert -- RE-RECORD --, therefor.

In Column 3, Line 60, please delete "(device" and insert -- device --, therefor.

In Column 8, Line 61, please delete "110. as" and insert -- 110, as --, therefor.

In Column 11, Line 4, in Claim 2, please delete "the step of" and insert -- the --, therefor.

In Column 12, Line 63, in Claim 20, please delete "instructing the" and insert -- instructing, by the mail server, the --, therefor.

In Column 13, Line 1, in Claim 21, please delete "receiving" and insert -- receiving, by the mail server, --, therefor.

Signed and Sealed this
Seventeenth Day of July, 2012

David J. Kappos
*Director of the United States Patent and Trademark Office*